United States Patent

Centala et al.

[15] 3,638,100
[45] Jan. 25, 1972

[54] CIRCUIT TO PREVENT A TRANSFORMER FROM PRESENTING A LOW IMPEDANCE UPON CORE SATURATION

[72] Inventors: John P. Centala; Royce W. Lane, both of Cedar Rapids, Iowa

[22] Filed: Mar. 29, 1971

[21] Appl. No.: 128,747

[52] U.S. Cl............................................321/45 R, 331/113 A
[51] Int. Cl..............................................................H02m 7/48
[58] Field of Search...............................321/45 R; 331/113 A

[56] References Cited

UNITED STATES PATENTS

| 3,092,786 | 6/1963 | Bayne | 321/45 R X |
| 3,263,122 | 7/1966 | Genuit | 331/113 A X |
| 3,281,644 | 10/1966 | Moore et al. | 321/45 R |
| 3,383,582 | 5/1968 | Bishop et al. | 321/45 R X |
| 3,403,319 | 9/1968 | Tate | 321/45 R X |
| 3,417,348 | 12/1968 | Moore | 331/113 A |
| 3,473,104 | 10/1969 | Tate | 321/45 R |

Primary Examiner—William M. Shoop, Jr.
Attorney—Richard W. Anderson and Robert J. Crawford

[57] ABSTRACT

An externally driven saturating transformer inverter is provided with an auxiliary commutating transformer whose windings are connected with those of a power transformer and diode members such that upon saturation of the power transformer core, a high-reflected load impedance is presented. High-current spike generation is obviated while the regulation advantages of pulse width modulation is retained.

5 Claims, 1 Drawing Figure

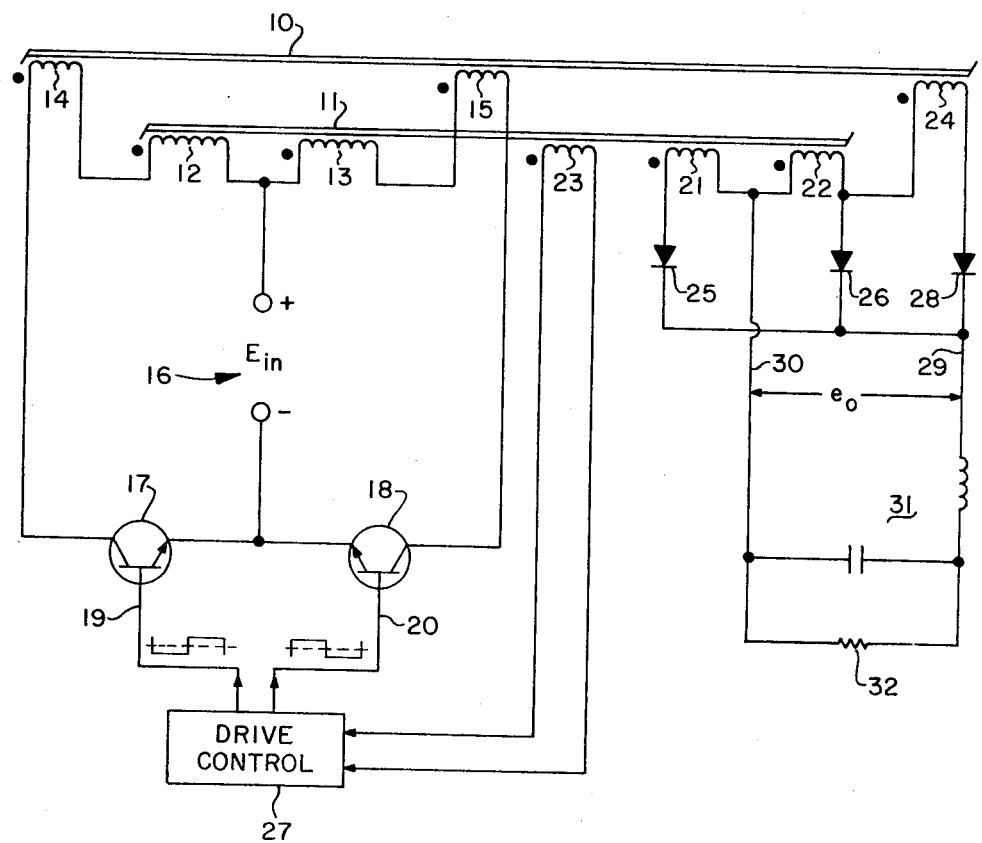

CIRCUIT TO PREVENT A TRANSFORMER FROM PRESENTING A LOW IMPEDANCE UPON CORE SATURATION

This invention relates to power supplies and more particularly to an improved inverter-type DC-DC converter.

Static inverter circuitries of the type employing pulse width modulation utilize saturable cores and have the disadvantage of generating a high current spike when transformer saturation occurs. Switching devices employed with the saturable core transformers must carry this high current until, in the particular mode of operation, the switching device is turned off. The resulting periodic high current impulses are reflected into the output of the circuitry and present subsequent filtering problems.

Means have been employed in the art to utilize an auxiliary core member in addition to the main power transformer core with the auxiliary core designed to saturate during the application of supply input voltage at a time preceding that time at which the main power transformer could saturate. Control means have been incorporated which, in response to the detection of saturation of the auxiliary core member by a sensing winding carried thereon, disable the switching device supplying power to the main power transformer. Thus a mode of operation is realized wherein a dead time zone is effected between successive applications of line input power to the power transformer. Saturation of the primary power output transformer is prevented and the situation leading to current spikes generation is eliminated.

The present invention has a primary object thereof the provision of a circuitry for use with an externally driven pulse width modulated inverter which permits power transformer saturation without presenting a low impedance which would cause current spike generation.

The present invention is featured in the provision of incorporating, with a main power transformer, an auxiliary transformer which carries primary windings in series with the power transformer primary windings and sensing winding means so interconnected with the power transformer output windings that, upon saturation of the power transformer core, a high reflected load impedance is presented to obviate the generation of high current spikes.

These and other features and objects of the present invention will become apparent upon reading the following description with reference to the accompanying drawing in which the single FIGURE schematically represents an inverter circuitry in accordance with the present invention.

In accordance with the above defined objectives, the present invention provides a control circuitry for use with an inverter type DC-DC converter of the type employing transformer core saturation. The control circuitry permits the known regulation advantages of pulse width modulated inverter circuitries while preventing the power transformer from presenting a low impedance when it saturates.

As above discussed, the disadvantage of an ordinary pulse width modulated inverter is that the resultant current increase when transformer saturation occurs lasts until the switching device is turned off. In accordance with the present invention means are provided whereby this current increase may be prevented for any desired length of time, during which time the switching device can be turned off. As depicted in the FIGURE the circuitry of the present invention consists generally of a main power transformer comprised of a saturable core member 11, with associated primary and secondary windings and control winding, along with an auxiliary transformer with its associated primary and secondary windings.

A center-tapped secondary winding of the power transformer is connected to output terminals connecting to a filter and load member. The secondary winding on the auxiliary transformer is connected in circuit with the power transformer secondary and to the output terminals. Diode members associated with both the primary power transformer output winding and the auxiliary transformer output winding are connected in circuit such that saturation of the power transformer primary winding does not present a low impedance to the switching devices through which line input power is applied, since a reflected load impedance is presented to the driving windings.

The load impedance control presented to the power transformer accomplishes the aforedefined objectives of the present invention and may be comprehended by a consideration of the following operational characteristics of the control circuitry.

With reference to the FIGURE, a DC input line voltage 16 is alternately switched through primary windings 12 and 13 of the power transformer, and through respective series interconnected primary windings 14 and 15 of the auxiliary transformer, by an associated conductive one of switching transistors 17 and 18. Switching transistors 17 and 18 are controlled by an external drive control 27 providing base drive square wave inputs to the transistors. The switching inputs 19 and 20 are 180° out of phase such that, in a conventional manner, transistors 17 and 18 are alternately switched on. The conducting one of the switching transistors 17 and 18 conventionally provides a low impedance path which serially interconnects the DC line input voltage source 16 with an associated one of the power transformer primary windings 12 or 13 and its series interconnected one of the auxiliary transformer primary windings 14 and 15.

The power transformer is provided with first and second series connected secondary windings 21 and 22. The junction between windings 21 and 22 defines a first output terminal 30. The ends of secondary windings 21 and 22 are respectively connected through diode members 25 and 26 to the second output terminal 29.

The auxiliary transformer carries a secondary winding 24 one end of which is connected to the junction between secondary winding 22 of the power transformer and diode member 26. The other end of the auxiliary transformer secondary winding 24 is connected through a further diode member 28 to the second output terminal 29. The voltage $e_o$ across output terminals 29 and 30, as will be further described, comprises a full wave rectified voltage which is subsequently filtered by LC filter 31 and applied to a load member 32.

In operation, considering an initial time $t_o$ when transistor 18 is rendered conductive by input switching control waveform 20, the two transformers have respective primary windings in series and secondary windings in parallel, giving an output voltage $e_o$ lower than that resulting from either transformer alone. The situation exists for a short period of time (typically a few microseconds). During this initial sequence transistor 18, in being switched "on," causes the input line voltage 16 to divide between primary winding 13 of the power transformer and primary winding 15 of the auxiliary transformer in a ratio determined by the impedance ratio of the windings. Diode member 25 is forward biased and conducts the output current.

The core area of the auxiliary transformer core member 10 and the number of windings on primary winding 15 of the auxiliary transformer is defined such that the auxiliary transformer saturates in a few microseconds. The first operational sequence between initial time $t_o$ and saturation of the auxiliary transformer is thus defined.

On saturation of the auxiliary transformer core 10, all of the line input voltage source 16 appears on primary winding 13 of the power transformer, and the auxiliary transformer is "out of the picture." This segment of the operation continues until it is desired to end the "on time," as defined by the periodicy of the switching transistor control waveforms 19 and 20. At this period of time switching transistor 18 is turned off (the conclusion of the first half-cycle of the control switching waveform).

After a time during which both switching transistors 18 and 17 are "off," switching transistor 17 is turned on, and the line input voltage 16 now divides between primary winding 12 of the main power transformer and primary winding 14 of the auxiliary transformer (a low impedance series interconnection between these windings and the line voltage source 16 now provided by conducting transistor 17). With transistor 17 conducting, and line voltage source 16 dividing between windings 12 and 14, current tends to flow in secondary winding 22 of the power transformer and secondary winding 24 of the auxiliary transformer (not winding 21 as before). The difference between the turns ratio defined by windings 12 and 22 and the turns ratio defined by windings 14 and 24 is chosen such that the current in secondary winding 22 exceeds that in secondary winding 24. Excess current thus flows through diode member 26, and both diode members 26 and 28 are now conducting. This places zero voltage on secondary winding 24 of the auxiliary transformer (assuming equal diode drop) which in turn defines a zero voltage condition on primary winding 14 of the auxiliary transformer. Thus all of the line voltage source 16 is imposed on the primary power transformer winding 12, and the auxiliary transformer remains in the saturated condition into which it was driven at the outset of the first half-cycle of operation.

Switching transistor 17 is allowed to remain conductive until the primary power transformer core 11 saturates at which time turnoff is initiated by conventional means in drive control 27 which senses this saturation by noting the reduction in voltage on the control winding 23. With initiation of turnoff, switching transistor 17 continues to conduct due to the finite time required to sense saturation in the power transformer core 11 and effect a complete turnoff of switching transistor 17. The line voltage input 16 is now forced to appear on primary winding 14 of the auxiliary transformer, since primary winding 12 of the main power transformer has a low impedance due to saturation. Under this condition, secondary winding 24 of the auxiliary transformer has some voltage induced therein and diode member 28 conducts, with current flowing through diode member 28, the load 32, secondary winding 22 of the main power transformer and secondary winding 24 of the auxiliary transformer. The auxiliary transformer is designed to support this voltage until switching transistor 17 can be turned off (a period of a few microseconds). A subsequent repeat first half-cycle sequence is initiated by "turn-on" of transistor 18 by source 20.

Thus, with the power transformer operating normally (not saturated) primary winding 14 of the auxiliary transformer appears shorted, yet when the primary power transformer saturates, primary winding 14 of the auxiliary transformer offers a much higher impedance—the reflected lead impedance— and load current continues to be supplied with the output voltage, $e_o$, being slightly higher than during normal operation of the power transformer due to the turns ratio required to establish a current in secondary winding 22 of the main power transformer which is greater than that through secondary winding 24 of the auxiliary transformer when switching transistor 17 is switched on by base drive signal 19.

In operational summary, during a first half-cycle of the switching control waveforms 19 and 20, switching transistor 18 is rendered conductive and the main power transformer operates normally without saturation. Primary winding 14 of the auxiliary transformer appears shorted during all but the first few microseconds of this time interval. During the successive half-cycle of the input switching waveforms 19 and 20, transistor 18 is cut off and transistor 17 rendered conductive for a period of time sufficient to saturate the primary power transformer. With the primary transformer saturated, the primary winding 14 of the auxiliary transformer presents a much higher impedance in the form of the reflected load impedance. Since in a first half-cycle of operation, the power transformer core 11 does not saturate, and in the subsequent half-cycle of operation the power transformer saturates but the switching device is presented a high reflected load impedance, the generation of high current spikes is prevented.

The present invention is thus seen to provide a control circuitry for a DC—DC converter permitting the inherent regulation advantage of pulse width modulation by making use of core saturation to initiate input line voltage switching while not permitting the generation of high current impulses upon core saturation. The circuitry to accomplish this objective is of minimal complexity; minimal sensing feedback is necessary between the output and the input; and the circuitry may be implemented with minimal component requirements and minimal complexity.

Although the present invention has been described with respect to a particular embodiment thereof, it is not to be so limited as changes might be made therein which fall within the scope of the invention as defined in the appended claims.

We claim:

1. A static inverter circuitry comprising a power transformer, an auxiliary transformer, each of said transformers including a saturable core member, said power transformer comprising first and second like wound serially connected primary windings and first and second like wound serially connected output windings; said auxiliary transformer comprising first and second like wound primary windings and a secondary winding; an input DC power source, each of said first and second power transformer primary windings being series interconnected in like polarization with an individual associated one of said auxiliary transformer primary windings, means alternately serially connecting said DC line power source to respective serially interconnected ones of said power and auxiliary transformer primary windings, the junction between said power transformer output windings comprising a first output terminal, the respective end terminals of said series interconnected power transformer output windings and that of said auxiliary transformer secondary winding being connected through respective like polarized diode members to a second output terminal, the other end of said auxiliary transformer secondary winding being connected to the end of the second one of said power transformer output windings, and the comparative primary to secondary turns ratio of said auxiliary transformer to that of said power transformer defining a current in said second power transformer output winding in excess of that induced in said auxiliary transformer secondary winding upon application of DC power source thereto.

2. A static inverter as defined in claim 1 wherein said means for alternately serially connecting said DC input voltage source comprises first and second transistors the emitter-collector junctions of which are serially connected with said DC voltage source and respective ones of said serially connected transformer primary windings, and base drive means associated with each of said transistors to alternately render said transistor conductive at a predetermined rate.

3. A static inverter as defined in claim 2 wherein the serially interconnected ones of said transformer primary windings comprise respective numbers of turns that the current induced in said auxiliary transformer primary winding upon energization thereof is sufficient to saturate said auxiliary core member prior to the saturation of the serially connected one of said power transformer primary windings, said saturation being effected a predetermined period of time after the initiation of the application of said DC input voltage source thereto.

4. A static inverter as defined in claim 3 wherein the saturation of said auxiliary core member is effected at a time substantially less than that during which said DC input power source is applied thereto.

5. A static inverter circuitry as defined in claim 4 wherein said saturation of said auxiliary core member is effected for substantially all of the time period of application of DC input power thereto.

* * * * *